Patented Nov. 21, 1950

2,531,336

UNITED STATES PATENT OFFICE 2,531,336

RECOVERY OF NICKEL AND COBALT COMPOUNDS

Robert C. Hills and Maurice F. Dufour, Nicaro, Cuba, assignors to Nicaro Nickel Company, New York, N. Y., a corporation of Delaware No Drawing. Application March 18, 1946, Serial No. 655,372. In Cuba September 23, 1944

6 Claims. (Cl. 23—61)

This invention relates to an improved method of recovering the nickel and cobalt content from technical ammoniacal leach liquors containing compounds of such metals in solution with various unavoidable impurities.

These ammoniacal product leach liquors may be derived by leaching in accordance with known procedures reduced nickeliferous ores of the oxide and silicate type with ammoniacal leach solution, as for example, ammoniacal solutions of ammonium carbonate. These product leach liquors, in accordance with a heretofore suggested procedure, have been treated for the separate recovery of the nickel content and the cobalt content by heating the solution and distilling off ammonia only until the nickel content has precipitated, filtering out the nickel precipitate, then distilling off the remainder of the ammonia from the filtrate thereby precipitating the cobalt content, and finally separating the cobalt precipitate. Tests conducted by the present applicants following this known procedure involving the leaching of ores theretofore reduced by small scale or laboratory processes with such ammoniacal product leach solutions lead to fairly satisfactory separate and complete recovery of the nickel and cobalt compounds, but when said procedure was later applied to technical ammoniacal product leach solutions derived by leaching reduced ores produced in large scale operations, metal fractions were obtained unsatisfactory both as to purity and as to yields. Furthermore, the cobalt content could not be precipitated and separated successfully due to its failure to hydrolyze and form cobalt hydroxide precipitate.

It has now been discovered that the failure in large scale operations was due to the continued presence of cobalt compounds in the cobaltous state which in turn was found to be due to the presence of certain impurities contained in the technical leach solutions not present in the laboratory samples theretofore treated. These impurities were found to have the power of perpetuating the presence of cobaltous compounds in the solutions either by inhibiting the complete oxidation of the cobaltous content to the cobaltic state and/or by causing reduction of a portion of the cobaltic compounds to cobaltous compounds. The presence of cobaltous compounds in the product leach liquor leads to cobalt in the nickel fraction first precipitated from the liquor apparently for the reason that unlike the cobaltic ammonium complexes the cobaltous ammonium complexes in the product leach liquor decompose under substantially the same conditions as of temperature as the nickel ammonium complexes and hence precipitate along with them.

Inasmuch as the leaching of the reduced nickel-cobalt ores with ammoniacal leach solutions is accompanied by aeration, one would expect that any cobalt in the cobaltous form would be converted to the cobaltic state in the product liquor but experience has shown this not to be true when technical grades of materials are employed. An additional aeration of the product leach liquor after separation from the ore without the additions contemplated by the present invention serves to oxidize partially the cobaltous content and to lead to better recovery but tests indicate that the results are not satisfacory for commercial operation.

The inability to obtain complete and permanent oxidation of the cobaltous compounds during aeration as heretofore practiced has been found by the present applicants to be due to the presence of impurities, particularly sulfur present in an incompletely oxidized form. Other impurities sometimes encountered and having the same detrimental effect but to a less degree are selenium and tellurium. The sulfur or other impurities in the technical product leach liquor may originate in the raw ore itself or may be introduced into the ore from the reducing gases or the heating gases employed, both of which ordinarily contain sulfur impurities due to sulfur in the coal and fuel oil used.

Basically considered, the present invention may be said to relate to the recovery of nickel substantially free of cobalt or of cobalt substantially free of nickel or of both nickel and cobalt each substantially free of the other from technical ammoniacal leach solutions containing such metals and the usual or unavoidable impurities by first removing (either physically or in effect) those impurities which maintain cobalt compounds in the cobaltous state either by preventing their oxidation or by reducing cobaltic compounds therein, and then selectively precipitating and separating the nickel content and the cobalt content. During or as a result of the removal of the impurities at least a part of the cobaltous content becomes oxidized to the cobaltic state apparently through the action of dissolved oxygen remaining from the aeration leaching treatment. If the residual oxygen present is insufficient to effect substantially complete oxidation of the cobaltous content, an additional oxidation treatment may be effected as by subjecting the liquor to simple aeration subsequent to the alkali treatment. The aeration treatment followed by filtration conventionally employed to precipitate and remove dissolved iron compounds from the product liquor can serve this additional oxidation function.

In accordance with a preferred embodiment of the invention, the sulfur or other impurities are rendered innocuous and removed in effect by treating the product leach liquor of the character above described with an addition of an alkali metal carbonate, as sodium and potassium carbonate, and then aerating, if required, until sufficient action or reaction has occurred. The selective and successive precipitation of the nickel content and the cobalt content may then be effectively accomplished by subjecting the treated product liquor to distillation to drive off ammonia until substantially all but only the nickel content has precipitated, separating said precipitate as by filtering it from the remaining solution containing the cobalt content, and recovering the cobalt content by any suitable method as for example distilling off the remainder of the ammonia thereby precipitating the cobalt content and separating said precipitate from the solution as by filtration. In the foregoing process, an alkali metal hydroxide may be used instead of the carbonate.

In an alternative embodiment of the invention, the sulfur impurities may be effectively removed by subjecting the technical product leach liquor to an oxidizing treatment of a severity sufficient to oxidize the sulfur or other impurities into and maintain them in an inactive state as by treating them with an addition of hydrogen peroxide or other per-compound or salt as sodium perborate, or, by subjecting it to electrolytic oxidation. Other methods of oxidizing or otherwise removing the sulfur impurities will occur to those skilled in the art. This treatment may also oxidize the cobaltous compounds to the cobaltic state. A subsequent aeration may be required for complete oxidation.

The action of the hereinbefore described additions of sodium carbonate or other reagent to the product leach liquors is speeded up by carrying out the reaction at elevated temperatures. Any high temperature may be employed so long as the treatment does not prematurely decompose the ammonia complexes and precipitate the metal content. Inasmuch as the use of high temperatures renders the operation more costly, it is preferred to operate at moderately raised temperatures for a longer period. Although room temperatures may ordinarily be used, the period of reaction is uneconomically long.

Where either more complete recovery of nickel and cobalt or more complete separation of the one metal from the other justifies the added expense, a special embodiment of the process of the present invention may be employed in which the treatment with the sodium carbonate or other reagent and aerating if required is followed by precipitating the whole nickel and cobalt contents together as by stripping the solution of all of its ammonia, then filtering and washing the precipitate with distilled hot water, next redissolving the precipitate in fresh ammonia leach liquor and finally separately and successively precipitating the nickel content and the cobalt content as hereinbefore described. This redissolving embodiment of the invention accomplishes the reduction of the amounts of the residual cobalt and nickel in the respective nickel and cobalt fractions by half.

In the following examples which illustrate two embodiments of the present invention, the technical ammoniacal product liquor called for as the starting material is obtained by leaching and aerating reduced ore with an ammoniacal leach liquor composed of an aqueous solution containing 3% ammonia as ammonium carbonate and 3% ammonia as ammonium hydroxide, the said reduced ore being obtained by subjecting finely divided lateritic nickeliferous ore, such as is found in Cuba, to the action of reducing gases derived by the controlled combustion of coal and to heating gases derived by the combustion of commercial grades of fuel oil. The liquors contain sulfur impurities originating in the fuels used.

*Example 1*

Sodium carbonate is added to the ammoniacal product liquor above described in the proportion of 5 kilograms per kiloliter. This mixture is then heated in an autoclave for 30 minutes at a temperature of 250° F. Thereupon, the mass is cooled and after aeration is then subjected to distillation to evaporate ammonia and precipitate the nickel content. When sufficient ammonia has been removed to precipitate substantially all of and only the nickel content, the distillation is discontinued and the mass filtered to separate the nickel precipitate from the remaining solution containing the cobalt. Thereupon, the distillation is resumed until all of the ammonia has been stripped thereby precipitating the cobalt content which is also separated by filtering. Through this procedure a nickel fraction can be obtained containing only .39% cobalt and a cobalt liquor containing only .010% nickel.

*Example 2*

Sodium carbonate is added to the ammoniacal product liquor in the proportions indicated in the preceding example. After the mixture has been heated in an autoclave for 30 minutes at 250° F. and aerated, it is completely stripped of ammonia to precipitate both the nickel and the cobalt content together. Thereupon the mixed precipitate is washed with hot distilled water and is then redissolved in fresh ammoniacal-ammonium carbonate leach liquor. The new solution obtained is fractionally precipitated in accordance with the procedure outlined in Example 1. By this procedure the cobalt content in the nickel fraction amounts to only 0.19%. The cobalt liquor obtained contains only 0.0579% of nickel.

In order to illustrate more clearly the effectiveness of the present invention, the results obtainable by the illustrated embodiments are compared with results obtained in two test runs wherein no sodium carbonate or other agent adapted to remove those impurities interfering with the clean separation of the nickel content and the cobalt content was used. In the first test the ammoniacal product liquor without any addition was distilled to strip sufficient ammonia only to precipitate practically all of the nickel content and was then filtered. The nickel fraction obtained contained a comparatively large amount of cobalt amounting to 0.8%. The filtrate or remaining solution containing the cobalt content included 0.129% nickel. This cobalt could not be separated from the solution by continuation of the distillation operation in the normal manner because the cobalt-ammonium complexes therein would not hydrolyze completely to give a cobalt hydroxide precipitate.

In order to show that the cleaner separation of nickel and cobalt obtained by the practice of the process as illustrated in Examples 1 and 2 is not due to the heat treatment, a second test was run in which a portion of the ammoniacal product liquor was heated without any addition of sodium carbonate in an autoclave at 250° F. for 30 minutes, then after aeration was stripped completely of ammonia to precipitate the whole metal content, was filtered and washed four times with distilled water at 200° F., then redissolved in the 6% ammoniacal leach liquor and finally fractionated in accordance with the procedure of Examples 1 and 2. The cobalt content of the nickel fraction and the nickel content of the cobalt liquor were not substantially reduced, thereby showing that the heat treatment alone will not lead to the results obtained by the practice of the present invention wherein sodium carbonate or other agent is employed.

The results of the two embodiments of the invention and the comparative tests are summarized in the following table:

| Treatment | Nickel Content in Original Liquor | Cobalt Content in Nickel Precipitate | Nickel Content in Cobalt Liquor | Behavior of Cobalt Liquor |
|---|---|---|---|---|
| EX. 1 | | | | |
| Na₂CO₃ added, heated to 250° F., cooled, aerated, and fractionated | Per cent .80 | Per cent 0.39 | Per cent .010 | Hydrolyzed normally. |
| EX. 2 | | | | |
| Na₂CO₃ added, heated to 250° F., aerated, stripped, washed, redissolved | 1.50 | 0.19 | .0579 | Hydrolyzed normally. |
| TEST 1 | | | | |
| None | 1.0 | 0.80 | .129 | Did not hydrolyze normally. |
| TEST 2 | | | | |
| Heated to 250° F., aerated, stripped, washed, redissolved | 1.77 | 0.70 | .159 | Did not hydrolyze normally. |

In the process of the invention, the amount of sodium carbonate or other reagent added to the product leach liquor varies according to the amount of sulfur or other impurities contained in the liquor. The quantity used is not critical and hence need be only sufficient to accomplish the desired result, which quantity may be determined in any specific operation of the process by simple laboratory test.

This application is in part a continuation of our co-pending application Serial No. 475,811 filed February 13, 1943, now abandoned.

It should be understood that the present invention is not limited to the specific materials or details of operation hereinbefore disclosed but that it extends to all equivalent substances and procedures which will occur to those skilled in the art upon consideration of the claims appended hereto.

We claim:

1. In the recovery of nickel from technical ammoniacal leach solutions containing nickel and cobalt compounds and the usual impurities including at least one of sulfur, selenium, and tellurium, the process of obtaining the nickel content substantially free of cobalt which comprises converting said named impurities, by oxidation, into a form which does not inhibit the oxidation of the cobaltous compounds present into the cobaltic state, oxidizing the cobaltous content to the cobaltic state in said ammoniacal leach solution, distilling ammonia from said solution until the nickel content precipitates out from the solution containing the cobaltic compounds still in solution, and separating the precipitated nickel compound from the said solution.

2. In the recovery of nickel from technical ammoniacal leach solutions containing nickel and cobalt compounds and the usual impurities including at least one of sulfur, selenium, and tellurium, the process of obtaining the nickel content substantially free of cobalt which comprises converting said named impurities by oxidation into a form which does not inhibit the oxidation of the cobaltous compounds present into the cobaltic state by adding an alkali metal carbonate to the solution and aerating the resulting reaction mixture, and whereby the cobaltous compounds present are oxidized to cobaltic compounds by said aeration, distilling ammonia from said solution until the nickel content precipitates out from the solution containing the cobaltic compounds still in solution, and separating the precipitated nickel compound from the said solution.

3. In the recovery of nickel from technical ammoniacal leach solutions containing nickel and cobalt compounds and the usual impurities including at least one of sulfur, selenium, and tellurium, the process of obtaining the nickel content substantially free of cobalt which comprises converting said named impurities by oxidation into a form which does not inhibit the oxidation of the cobaltous compounds present into the cobaltic state by adding sodium carbonate to the solution and aerating the resulting reaction mixture, and whereby the cobaltous compounds present are oxidized to cobaltic compounds by said aeration, distilling ammonia from said solution until the nickel content precipitates out from the solution containing the cobaltic compounds still in solution, and separating the precipitated nickel compound from the said solution.

4. In the recovery of nickel from technical ammoniacal leach solutions containing nickel and cobalt compounds and the usual impurities including at least one of sulfur, selenium, and tellurium, the process of obtaining the nickel content substantially free of cobalt which comprises converting said named impurities, by oxidation, into a form which does not inhibit the oxidation of the cobaltous compounds present into the cobaltic state, oxidizing the cobaltous content to the cobaltic state in said ammoniacal leach solution, distilling off substantially all the ammonia from said solution thereby precipitating the nickel and cobalt contents, filtering and washing the said precipitate, dissolving the said precipitate in an ammonium carbonate solution, distilling ammonia from said solution until the nickel content precipitates out from the solution containing the cobaltic compounds still in solution, and separating the precipitated nickel compound from the said solution.

5. In the recovery of nickel from technical ammoniacal leach solutions containing nickel and cobalt compounds and the usual impurities including at least one of sulfur, selenium, and tellurium, the process of obtaining the nickel content substantially free of cobalt which comprises converting said named impurities by oxidation into a form which does not inhibit the oxidation of the cobaltous compounds present into the cobaltic state by adding an alkali metal carbonate to the solution and aerating the resulting reaction mixture, and whereby the cobaltous compounds present are oxidized to cobaltic compounds by said aeration, distilling off substantially all the ammonia from said solution thereby precipitating the nickel and cobalt contents, filtering and washing the said precipitate, dissolving the said precipitate in an ammonium carbonate solution, distilling ammonia from said solution until the nickel content precipitates out from the solution containing the cobaltic compounds still in solution, and separating the precipitated nickel compound from the said solution.

6. A process for recovering nickel and cobalt from technical ammonium carbonate leach solutions containing compounds of such metals and the usual impurities including at least one of sulfur, selenium and tellurium, which comprises, converting said named impurities by oxidation into a form which does not inhibit the oxidation of the cobaltous compounds present into the cobaltic state by adding an alkali metal carbonate to the solution, heating the resulting mixture and aerating the same, and whereby the cobaltous compounds present are oxidized to cobaltic compounds by said aeration, and then successively precipitating the nickel content and the cobalt content by distilling ammonia from said solution, and separating the precipitated nickel content from the solution before the cobalt content is precipitated.

ROBERT C. HILLS.
MAURICE F. DUFOUR.

REFERENCES CITED

The following references are of record in the file of this patent:

UNITED STATES PATENTS

| Number | Name | Date |
| --- | --- | --- |
| 330,454 | Aaron | Nov. 17, 1885 |
| 1,487,145 | Caron | Mar. 18, 1924 |
| 1,509,774 | Perkins | Sept. 23, 1924 |
| 2,290,313 | Caron | July 21, 1942 |